United States Patent [19]
Van Brussel et al.

[11] B 3,982,673
[45] Sept. 28, 1976

[54] DISPENSER FOR EXPLOSIVES HAVING ADJUSTABLE TRAP CHAMBER

[75] Inventors: William R. Van Brussel, Mount Pleasant; Joseph C. Lestage; Wayne J. Hartman, both of Burlington, all of Iowa

[73] Assignee: The United States of America as represented by the Secretary of the Army, Washington, D.C.

[22] Filed: Mar. 19, 1975

[21] Appl. No.: 559,954

[44] Published under the second Trial Voluntary Protest Program on February 3, 1976 as document No. B 559,954.

[52] U.S. Cl. .................................. 222/306; 222/368
[51] Int. Cl.² ...................... G01F 11/00; G01F 11/10
[58] Field of Search ........... 222/199, 305, 306, 363, 222/368, 160

[56] References Cited
UNITED STATES PATENTS

| | | | |
|---|---|---|---|
| 774,326 | 11/1904 | Kelly | 222/306 X |
| 2,820,577 | 1/1958 | Winters | 222/306 |
| 3,253,496 | 5/1966 | Beach et al. | 222/368 X |
| 3,278,090 | 10/1966 | Wahl | 222/199 |
| 3,353,722 | 11/1967 | Mehta | 222/306 X |

FOREIGN PATENTS OR APPLICATIONS

| | | | |
|---|---|---|---|
| 626,548 | 10/1961 | Italy | 222/368 |
| 571,316 | 1/1958 | Italy | 222/363 |

*Primary Examiner*—Robert B. Reeves
*Assistant Examiner*—David A. Scherbel
*Attorney, Agent, or Firm*—Nathan Edelberg; A. Victor Erkkila; Max Yarmovsky

[57] ABSTRACT

A ball having a variable volume cavity therein is integrally machined on a shaft which is rotatably supported between two bearings. The ball is maintained in intimate sliding contact with a hopper seal at all times. An air-operated actuator is used to rotate the shaft and ball 180° to place the ball in its load and unload positions. The variable volume cavity allows volumetric adjustments to be safely made even when dispensing sensitive explosive powders, such as lead azide. A hopper containing the explosive powder supply is bearing-mounted above the ball and funnel on two vertical shafts. The weight of the hopper maintains intimate contact between an electrically conductive plastic seal insert in the bottom of the hopper and the surface of the ball on which it rests and prevents leakage of powder during fill and discharge of the ball cavity.

3 Claims, 6 Drawing Figures

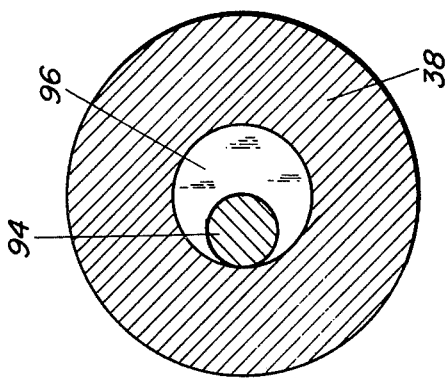
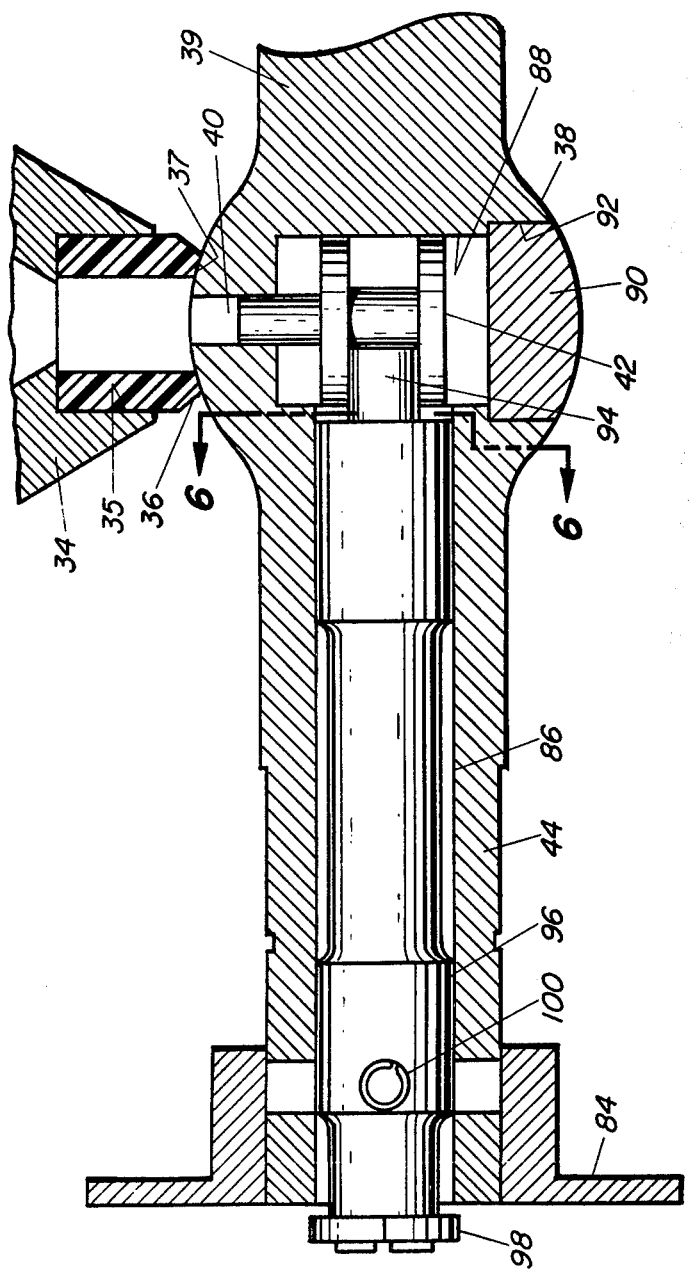
FIG. 6
FIG. 5

DISPENSER FOR EXPLOSIVES HAVING ADJUSTABLE TRAP CHAMBER

GOVERNMENTAL INTEREST

The invention described herein was made in the course of a contract with the Government and may be manufactured, used and licensed by or for the Government for governmental purposes without the payment to us of any royalty thereon.

BACKGROUND OF THE INVENTION

Various means have been used in the prior art to dispense initiating explosive powders.

Hand scooping of sensitive initiating powders has been used in the prior art, but this procedure exposes the operator to the explosive hazard and induces volume inaccuracies due to human error or carelessness. Loaders utilizing time delay circuitry have problems because the loader is complicated and costly to manufacture and in addition is subject to unpredictable explosions. Another problem with these prior art devices is that voiding can only be accomplished by either running dry or the dangerous procedure of aspiration. The problem with ladle type loaders is that they are messy, generally throw powder inside the barricade and lack accuracy. Powder volume in scooper type dispensers cannot be adjusted without substituting scoops. The procedure of changing scoops is generally hazardous unless the powder is first removed, which in turn makes the procedure time consuming. Another problem with the scoopers is that the volume to be dispensed is dependent upon available scoop sizes. In addition the drive mechanism of the latter device is complicated mechanically and difficult to apply to and synchronize with other loading equipment.

SUMMARY OF THE INVENTION

The present invention relates to a ball dispenser for distributing sensitive initiating explosives whose powder volume must be dispensed accurately. The device comprises an accurately machined and polished segment of a ball integrally machined on a shaft and supported axially between two bearings. The ball and shaft are rotated 180° and returned to a load position by use of an air-operated actuator. An important feature of the present device is a variably adjusted volume cavity designed into the ball and remotely operated, thus allowing volumetric adjustments to be safely made even when dispensing sensitive initiating explosive powders. A hopper is bearing mounted above the ball and has a conductive insert therein which maintains intimate contact with the ball, thereby preventing leakage of powder during the loading and unloading positions. The ball dispenser can be used on any free-flowing dry powder at speeds up to fifty charges per minute with dispensing accuracies of ±2% depending on the granular consistency of the powder.

An object of the present invention is to provide an initiating explosive powder dispenser which is accurate and repeatable.

Another object of the present invention is to provide an initiating explosive powder dispenser which can adjust its volume quickly and safely between machine cycles by a remote controlled adjustment.

Another object of the present invention is to provide an initiating explosive powder dispenser which minimizes hazards and inaccuracies because of operator judgment.

A further object of the present invention is to permit easy and safe voiding of excess explosive.

For a better understanding of the present invention, together with other and further objects thereof, reference is made to the following descriptions taken in connection with the accompanying drawings.

BRIEF DESCRIPTION OF THE DRAWINGS

FIG. 5 is a partial enlarged cross-sectional view of the shaft and ball cavity in its fill or loading position.

FIG. 6 is a partial cross-sectional end view of the eccentric shaft on the volume adjuster taken along line 6—6 of FIG. 5.

Throughout the following description like reference numerals are used to denote like parts of the drawings.

DESCRIPTION OF THE PREFERRED EMBODIMENTS

Figure 1:
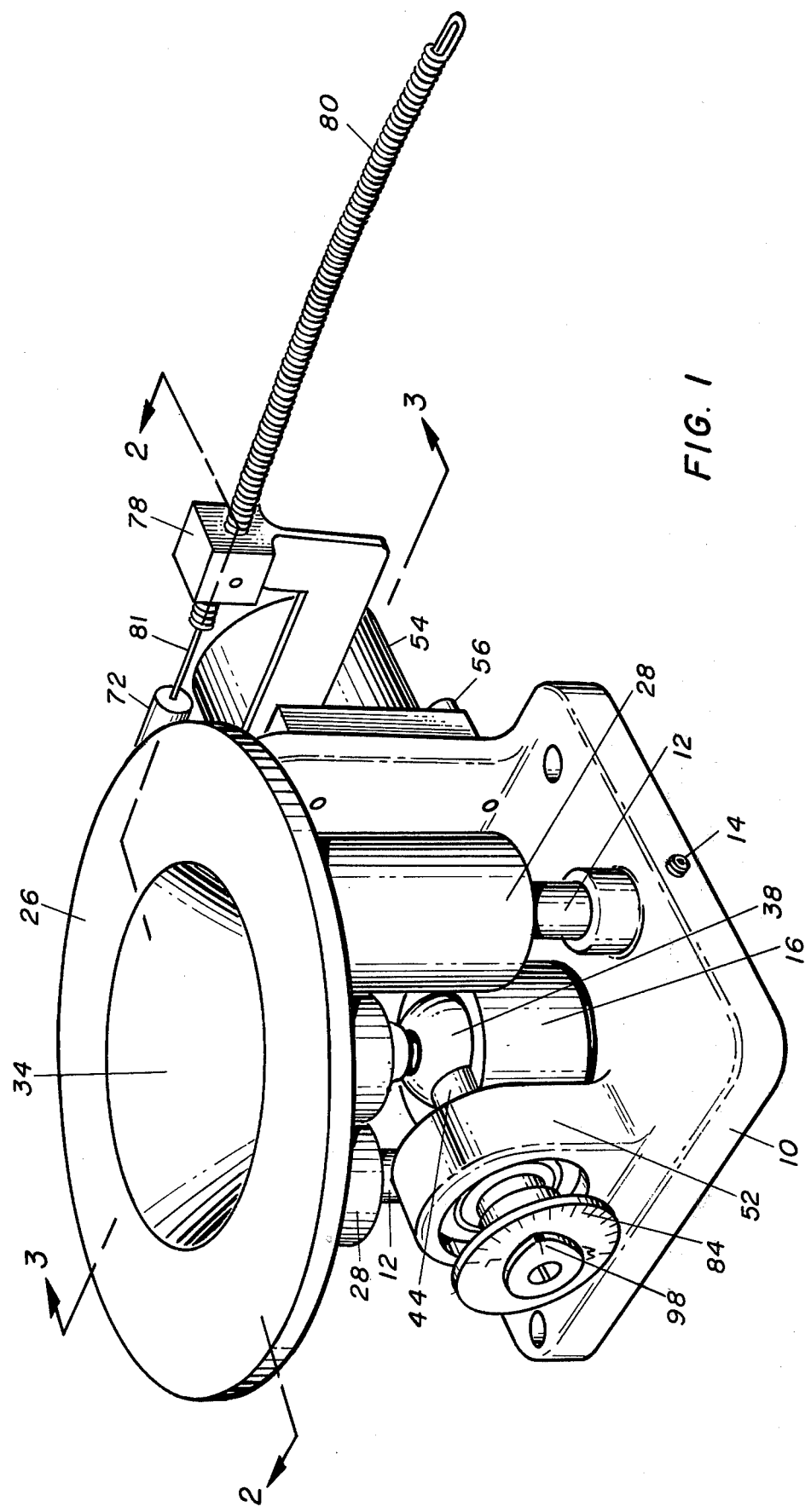
FIG. 1 is an isometric view of the ball dispenser.

Referring now to FIGS. 1–4 a base casting 10 acts as a frame for the entire dispenser. Base casting 10 has a pair of vertical guide rods 12 fixedly positioned therein by set screws 14. A funnel member 16, having a conically contoured funnel passageway 18 therein, is fixedly held to base 10 by cap screw 20. An "O" ring located in groove 24 precludes contamination between base 10 and funnel member 16. A circularly shaped flanged hopper casting 26 has a pair of integral guide bosses 28 vertically positioned thereon. The bosses 28 have bushing bores 30 axially positioned therein and are concentric with guide rods 12. Bushing bores 30 hold ball bushings 32 fixedly therein for guiding hopper 26 on guide rods 12. Hopper 26 has a hyperbolically shaped feeder section 34 which is axially aligned with funnel cavity 18. An electrically conductive plastic tubularly shaped seal insert 36 is fixedly held in feeder counterbore 35, shown in FIG. 5, so that it remains in contact with ball 38 when the dispenser is either in the loading or unloading position. One end of seal insert 36 has a spherically shaped surface 37 which matches the contour of ball 38 so that there is no leakage of powder from the hopper 26 when ball 38 is rotated from its loading to unloading position. The ball 38 contains the variable volume cavity 40 whose volume is controlled by the adjustable cavity bottom member 42. The ball 38 is rotatably positioned in sliding contact with seal insert 36. Ball shafts 44 and 46 are held by ball bearing races 48 and 48' which are located in bearing counterbores 50 and 50', which in turn are axially positioned in the base bearing housing sections 52 and 52' respectively. An air-driven actuator 54 is fixedly held to the side of base casting 10 by cap screws 56 and 56' so that actuator shaft 58 is axially aligned with and fits into second ball shaft counterbore 60. Actuator shaft 58 is fixedly locked to second ball shaft 46 by dowel pin 62. A remotely operable void cam member 64 is used to lift hopper 26 when it is desired to void the hopper 26. Void cam 64 is connected by means of shaft 66 and spring pins 68 to cam actuator 70. Cam actuator lever 70 is connected to wire holder 72 by shoulder bolt 74 and hex nut 76. Clamp 78 is fixed to the base frame 10 and holds wire conduit 80 therein by set screw 82. Control wire 81 and conduit 80 are extended to a safe location outside the loading machine barricade.

Figure 2:
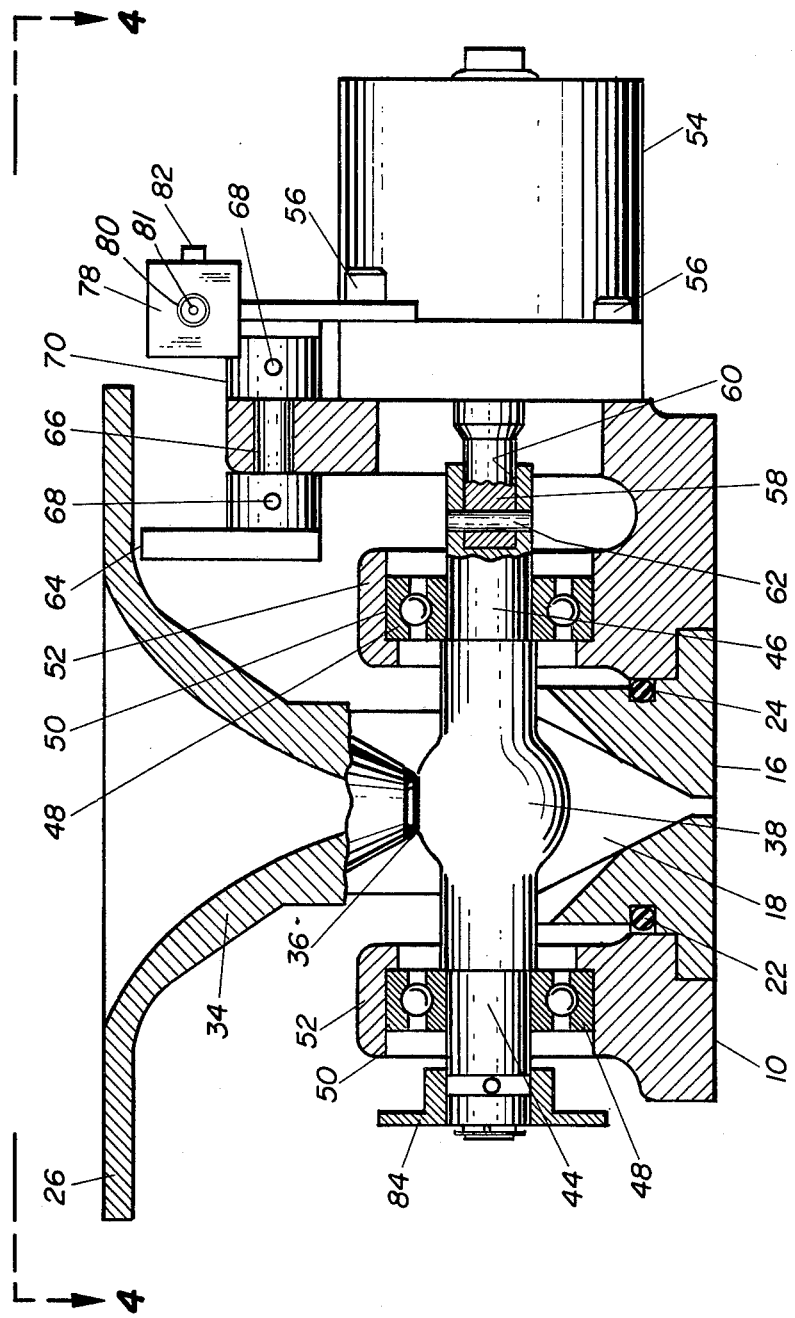
FIG. 2 is a partial cross-sectional view taken along line 2—2 of FIG. 1.
Figure 3:
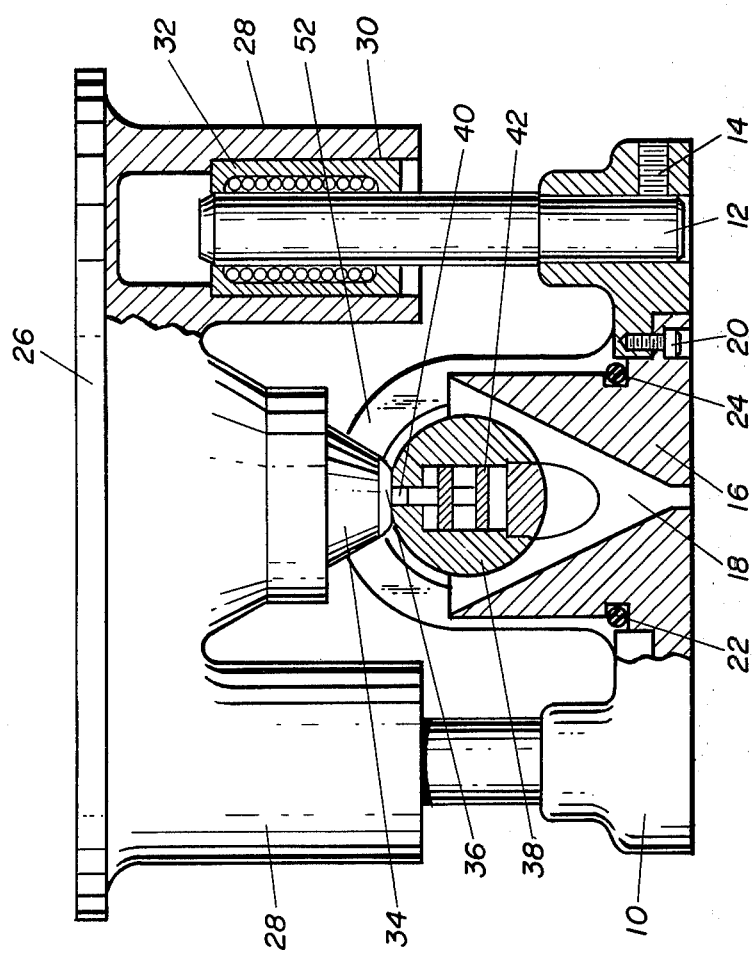
FIG. 3 is a partial cross-sectional view taken along line 3—3 of FIG. 1.
Figure 4:
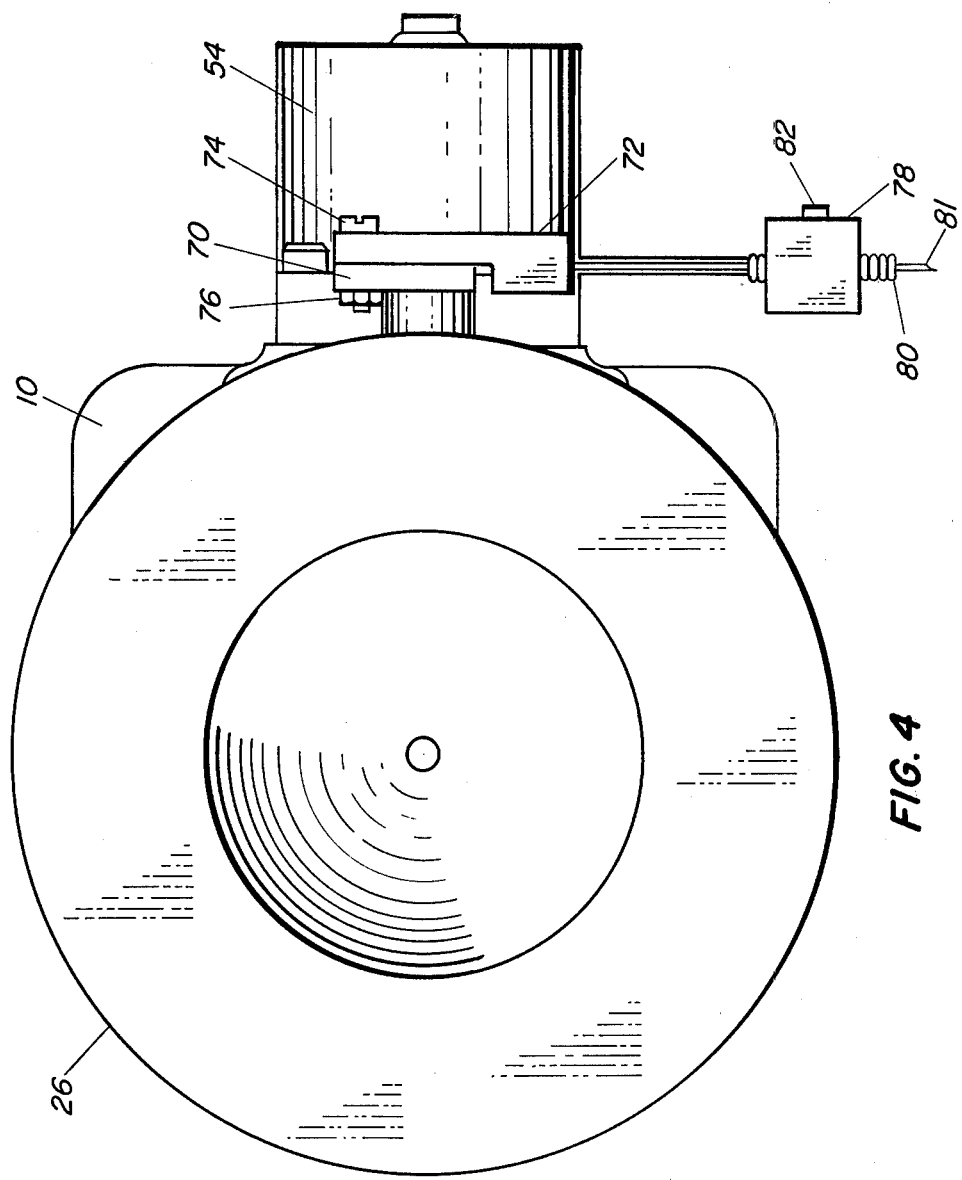
FIG. 4 is a plan view taken along line 4—4 of FIG. 2.

Referring now to FIGS. 2 and 5 and 6 a scale 84, which is calibrated to aid volume adjusting, is fixed to first ball shaft 44. Shaft 44 has a longitudinal axial adjuster bore 86 therein which communicates with a transversely positioned adjustable bottom member cavity counterbore 88 which on its bottom end is closed by plug 90 which fits in plug counterbore 92. Adjustable cavity bottom member 42 is moved either upwardly or downwardly by the angular position selected for eccentric shaft end 94. The particular angular position selected for volume adjuster shaft 96 is determined and can be set by the relative position of pointer 98 when viewed against the markings on scale 84. A spring pin 100 transversely positioned in adjuster shaft 96 locates and limits the motion between ball 38 and the volume adjuster shaft 96.

In operation after pointer 98 is set to a desired scale reading on scale 84 and the void cam member 64 is placed in its load position as shown in FIG. 2, the ball dispenser is located in a charging barricade and synchronized with a loading machine (not shown) by a mechanical cam located on the loading machine cam shaft. The loading machine cam actuates a four way air valve which controls the function of the 180° rotary actuator 54 causing it to rotate ball shaft 46 which then causes the ball 38 to rotate and dispense its premeasured charge into funnel cavity 18 at a time when a loading machine cup fixture (not shown) is in position under funnel member 16. After ball 38 discharges its powder into loading machine cup, ball 38 is then returned to its up or fill position by the continued rotation of the control cam actuating the aforementioned four way valve.

While there has been described and illustrated specific embodiments of the invention, it will be obvious that various changes, modifications and additions can be made herein without departing from the field of the invention which should be limited only by the scope of the appended claims.

Having thus fully described the invention, that which is claimed as new and desired to be secured by Letters Patent of the United States is:

1. A ball dispenser for initiating explosives which comprises:
    a base casting having integral bearing housing sections positioned thereon;
    a pair of vertically positioned guide rods fixedly attached to said base casting;
    hopper means slidably supported on said guide rods for holding a reserve supply of an explosive powder therein which includes;
        a circularly shaped flanged hopper casting having guide bosses vertically positioned thereon, said bosses having bushing bores axially positioned therein and a hyperbolically shaped feeder section having an axially positioned insert counterbore therein;
        ball bushings fixedly held in said bushing bores for slidably moving on said guide rods; and
        a seal insert fixedly positioned in said insert counterbore, said insert having a spherically shaped end which contacts said transport means and prevents powder leakage therefrom during loading, transport and unloading positions of said dispenser;
    variable volume transport means comprising a ball housing rotatably supported in said bearing housing sections for receiving a charge of explosive powder from said hopper means and for unloading said powder therefrom;
    means for funneling said powder from said transport means;
    actuator means for sequentially rotating said transport means from a loading position to an unloading position; and
    means for voiding said initiating explosive powders from said hopper means, said voiding means being remotely actuated.

2. A ball dispenser as recited in claim 1 wherein said variable volume transport means comprises:
    a ball housing having a first ball shaft end, a second ball shaft end, and a ball section, said housing having a longitudinal axial adjuster bore in said first ball shaft end, an actuator shaft counterbore axially aligned in said second ball shaft end, a variable volume cavity disposed in said ball section so that the longitudinal axis of said variable volume cavity is normal to the longitudinal axis of said adjuster bore, an adjustable bottom member counterbore disposed in axial alignment with said variable volume cavity and communicating therewith, a plug counterbore disposed in axial alignment with said bottom member counterbore and communicating therewith;
    an adjustable bottom member slidably positioned partially within said variable volume cavity and partially within said adjustable bottom member cavity;
    a plug fixedly positioned in said plug counterbore;
    a volume adjuster shaft having an eccentric shaft end, said eccentric end slidably engaging said adjustable bottom member causing said bottom member to vary its position in said variable volume cavity and to thereby vary the volume of said variable volume cavity;
    a scale member fixedly attached to said first ball shaft end; and
    a pointer fixedly attached to the other end of said adjuster shaft, said pointer indicating the position of said adjustable bottom member in said adjustable volume cavity.

3. A ball dispenser as recited in claim 1 wherein said seal insert is made of electrically conductive plastic material.

* * * * *